C. S. ROLLINS.
TEA STRAINER.
APPLICATION FILED DEC. 18, 1907.
913,055.
Patented Feb. 23, 1909.
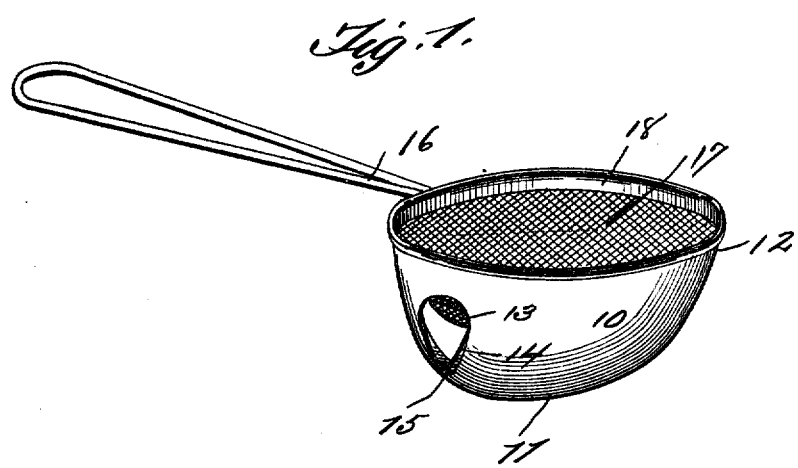
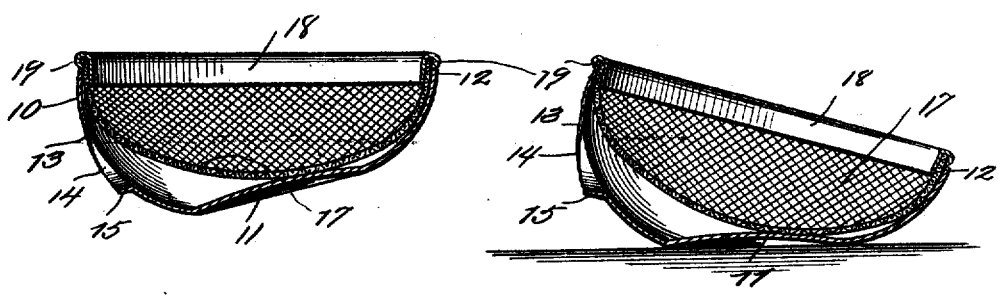
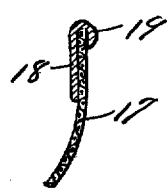
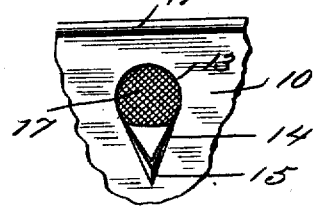
Inventor
Chas. S. Rollins.
By Alfred T. Gage,
Attorney
Witnesses

UNITED STATES PATENT OFFICE.

CHARLES S. ROLLINS, OF OAKLAND, CALIFORNIA.

TEA-STRAINER.

No. 913,055.  Specification of Letters Patent.  Patented Feb. 23, 1909.

Application filed December 18, 1907. Serial No. 407,097.

*To all whom it may concern:*

Be it known that I, CHARLES S. ROLLINS, citizen of the United States, residing at Oakland, county of Alameda, State of California, have invented certain new and useful Improvements in Tea-Strainers, of which the following is a specification, reference being had therein to the accompanying drawing.

This invention relates to a tea strainer and particularly to a construction embodying a drip cup combined therewith.

The invention has for an object to provide a novel and improved form of drip cup having its upper edge which supports the strainer inclined at an angle to the base thereof and provided at one side with a pouring aperture converging at its lower portion and there provided with out-turned flanges to catch and return to the cup any drip therefrom.

Other and further objects and advantages will be hereinafter set forth and the novel features thereof defined by the appended claim.

In the drawing—Figure 1 is a perspective of the invention; Fig. 2 a section thereof in pouring position; Fig. 3 a similar view in draining position; Fig. 4 a detail section of the screen band; and Fig. 5 a detail elevation showing the pouring aperture.

Like numerals of reference refer to like parts in the several figures of the drawing.

The numeral 10 designates the drain cup provided with a horizontally disposed bottom 11. The side walls of this cup gradually increase in height from one side to the other so as to dispose the upper edge 12 thereof at an angle to the plane of the bottom. At the highest portion of this wall an aperture 13 is formed for pouring the liquid from the cup. This aperture has angular converging lower walls 14 bent or flared outwardly at the apex 15 thereof. The cup is provided with a handle 16 of any desired construction. Mounted at the upper edge of the cup is a strainer screen 17 of wire cloth and preferably held in position by a band 18 which frictionally engages the edge of the cup. This band has an overturned edge 19 embracing and binding the edge of the wire cloth.

The strainer when in use is held in the position shown in Figs. 1 and 2 with the bottom inclined so that the liquid passing through the screen flows out of the aperture in the side wall. When the strainer is set upon a support all of the liquid at the aperture drains back into the cup which also catches the drain or drip from the screen. The flared apex of the aperture is important to prevent liquid following the outer surface of the cup after using and also acts as a spout in the pouring action and thus effectually prevents any moisture from the cup reaching the support upon which it rests. This cup is adapted to be formed by pressing and stamping operations and avoids the use of a projecting spout thus simplifying and economizing in the manufacture of the strainer. The screen is readily removable for cleansing and thus a very efficient construction comprising two parts is effected.

Having described my invention and set forth its merits what I claim and desire to secure by Letters Patent is:—

As an article of manufacture a strainer comprising a cup having its upper edge at an angle to the plane of the bottom thereof and its side wall provided with a V-shaped aperture having its lower walls converging downwardly and the metal of the cup body flared outwardly at the apex of the aperture, a handle secured at the upper portion of the cup in the plane of the upper edge thereof, and a screen supported from said upper edge.

In testimony whereof I affix my signature in presence of two witnesses.

CHARLES S. ROLLINS.

Witnesses:
 LOUISE LIND,
 LOTTIE M. CONKLIN.